United States Patent [19]

Linda et al.

[11] 3,717,393
[45] Feb. 20, 1973

[54] RADIAL FLUID-FILM BEARING

[75] Inventors: Josef Linda; Bohuslav Belohoubek; Jaroslav Marsalek, all of Prague, Czechoslovakia

[73] Assignee: TOS Hostivar, Narodni Podnik, Praha-Hostivar, Czechoslovakia

[22] Filed: March 15, 1971

[21] Appl. No.: 124,267

[30] Foreign Application Priority Data

March 17, 1970 Czechoslovakia.....................1754-70

[52] U.S. Cl..................................................308/122
[51] Int. Cl................................................F16c 17/02
[58] Field of Search.........................308/122, 73, 207

[56] References Cited

UNITED STATES PATENTS 1,947,559   2/1934   Mackensen ............................308/73
3,009,748   11/1961  Pitner....................................308/207

Primary Examiner—Milton Kaufman
Assistant Examiner—Frank Susko
Attorney—Richard Low and Murray Schaffer

[57] ABSTRACT

A hydrodynamic bearing for spindles and the like comprising a cylindrical shell surrounding the spindle. The shell is supported by three supports one of which is movable and is urged against the shell to deform it into triangular shape. The shell is housed in a sealed reservoir holding oil which provides a pressurized film between spindle and shaft tending to make the shell circular on rotation of the spindle.

12 Claims, 5 Drawing Figures

JOSEF LINDA
BOHUSLAV BELOHOUBEK
JAROSLAV MARSALEK
INVENTORS

JOSEF LINDA
BOHUSLAV BELOHOUBEK
JAROSLAV MARSALEK
INVENTORS

BY
ATTORNEY

RADIAL FLUID-FILM BEARING

BACKGROUND OF INVENTION

The present invention relates to spindle bearings and in particular to hydrodynamic, radial fluid bearings for journalling rotating shafts and the like.

Hydrodynamic bearings have been used for some time to journal rotating spindle shafts. Such bearings permit relatively accurate location of the spindle, precise operation and rotation of the spindle, and are sufficiently rugged to absorb vibration impact and heavy work loading. These bearings fall into two groups: the first, wherein the radial clearance of the spindle is rigidly fixed notwithstanding its speed of rotation; the second, wherein the radial clearance is automaticaly adjusted relative to the speed of spindle rotation. In both groups the entering wedge for initial fluid displacement is formed by co-action of the spindle with the journalling bearing shell; the provision of various pivoting segmented elements; or by some manipulation of the bearing shell itself.

In bearings of the first group, the radial clearance is predetermined according to a very precise and complex technological procedure based upon such factors as the velocity of the spindle, rigidity defined as a ratio of loading force to deformation, and heat generated, but primarily upon the skill and experience of the technician. Once the clearance is set, it cannot be changed. For this reason such bearings are highly susceptible to seizure and damage upon sudden changes in spindle revolution. Adjustment, therefore, for the highest speed would not achieve optimum or even efficient operation at lower speeds, or vice versa.

In bearings of the second group while radial clearance has been achieved automatically it is at the expense of very complex and complicated mechanisms, which have required very high precision in their manufacture and assembly. The various component parts have had to be specially and very carefully machined, finished, polished, and assembled under the greatest care. In particular bearings of this second group have manufacturing tolerances in microns and therefore are well beyond ordinary manufacturing standards.

It is the object of the present invention to provide hydrodynamic journal bearing overcoming the prior art drawbacks and defects.

It is another object of the present invention to provide a hydrodynamic bearing which is automatically adjustable to provide the optimum radial clearance under all operating conditions and spindle speed.

It is a further object of the present invention to provide a hydrodynamic bearing which will perform optimally and efficiently in direct response to spindle speed notwithstanding variations therein.

It is another object of the present invention to provide an improved radial fluid, journal bearing suitable for use in supporting spindle and shafts of machine tools and the like at the most optimum speeds.

It is a further object of this invention to provide a hydrodynamic journal bearing with maximum rigidity, bearing capacity, and flexibility of use.

It is a further object of this invention to provide a hydrodynamic journal bearing having less heat and frictional effects than the conventional hydrodynamic bearing.

It is a further object of the present invention to provide a hydrodynamic bearing having automatic response to changes in spindle speed in a range from a minimum to maximum of 1:25 or more.

It is a further object of the present invention to provide a radial fluid film hydrodynamic bearing which can be formed simply and economically with only normal machine tool tolerances for its dimensions.

These and other objects, together with numerous advantages will become apparent from the following disclosure.

SUMMARY OF THE INVENTION

According to the present invention a hydrodynamic bearing for a rotating spindle or shaft is formed of a cylindrical shell which surrounds the spindle. The shell is supported by a plurality of supports extending parallel to the axis of the shell and spaced about the circumference thereof. At least one of the supports is mounted for radial movement relative to the shell and is provided with biasing means for urging it against the shell to deform it against the other supports. The shell is surrounded by a housing which forms a reservoir for lubricating fluid. The rotation of the spindle displaces the bearing fluid forming a pressurized film between the spindle and shell. The film is formed continuously around the spindle forcing the shell into cylindrical shape no matter at what speed the spindle is rotated.

Preferably the supports are symmetrically arranged and are three in number, with two being fixed while one is normally biased by a spring. The housing comprises a rigid fixed wall or bore in a wall of a machine tool, and side retaining rings to which the supports are resiliently attached.

Full details of the invention are given in the following description and in the appended drawings.

DESCRIPTION OF INVENTION

Figure 4:
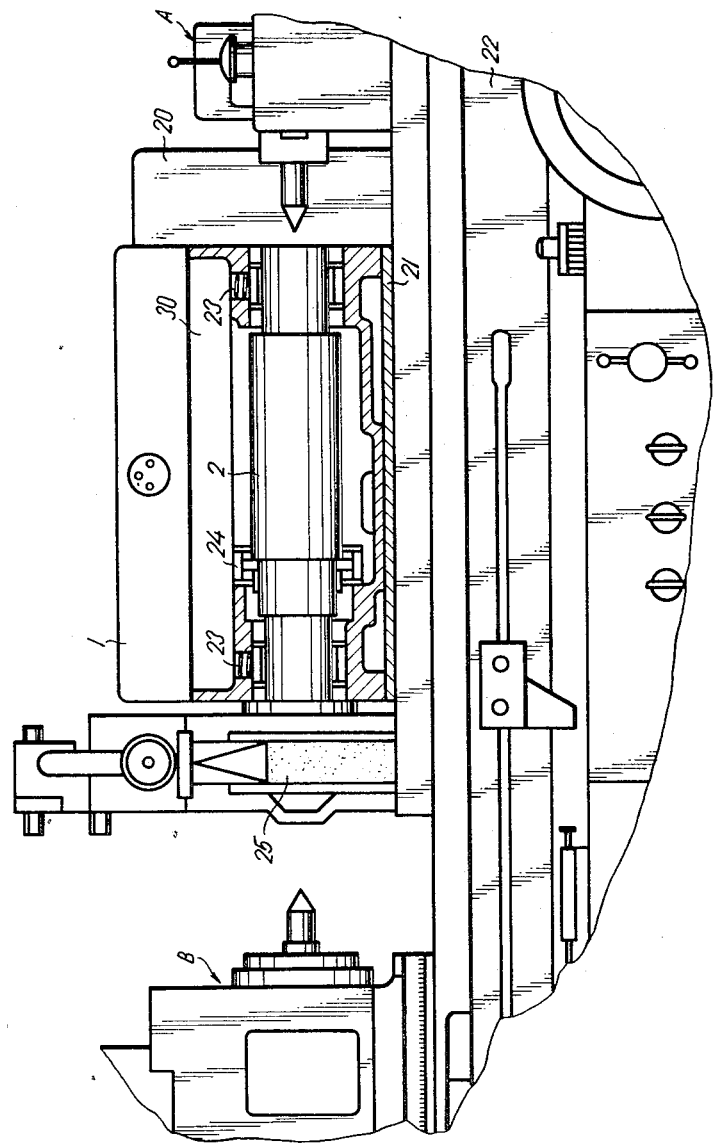
FIG. 4 is a side elevational view partially in section of a lathe-grinder showing the application of the bearing of the present invention to the journalling of a grinding spindle.

For illustration the present invention will be described in the form of a journal or radial bearing for the horizontally rotating shaft of a machine tool such as a universal lathe-grinder of conventional type although the application generally, to the support of rotating shafts will be obvious. Such machine is seen in FIG. 4 and in addition to the conventional lathe headstock A and tailstock B it comprises as housing body 1 set back rearwardly from the axis thereof of the stocks. The housing body 1 rests upon a bed 21 supported by the machine base and journals a shaft or spindle 2 extending parallel to the axis of the headstock and tailstock. A grinder wheel 25 is mounted at the forward end of the spindle 2 while suitable drive means 20, such as, fly wheels, gear box, pulley train connected to a motor, or a motor itself, is connected at the rear end. The specific details of such machine are believed to be so well known that further description here is not believed to be necessary.

The spindle 2 is mounted within the housing body 1 by means of a pair of hydrodynamic radial journal bearings 23 formed in accordance with the present invention and located at the forward and rear ends. The spindle 2 is preferably necked in one or more coaxial steps and is provided also with an axial or thrust hydrodynamic bearing 24 to prevent axial translation. A preferred form of axial bearing is fully described in the copending application of the same inventor based upon his Czechoslovak patent application PV 2452-70 filed Apr. 13, 1970.

Figure 1:
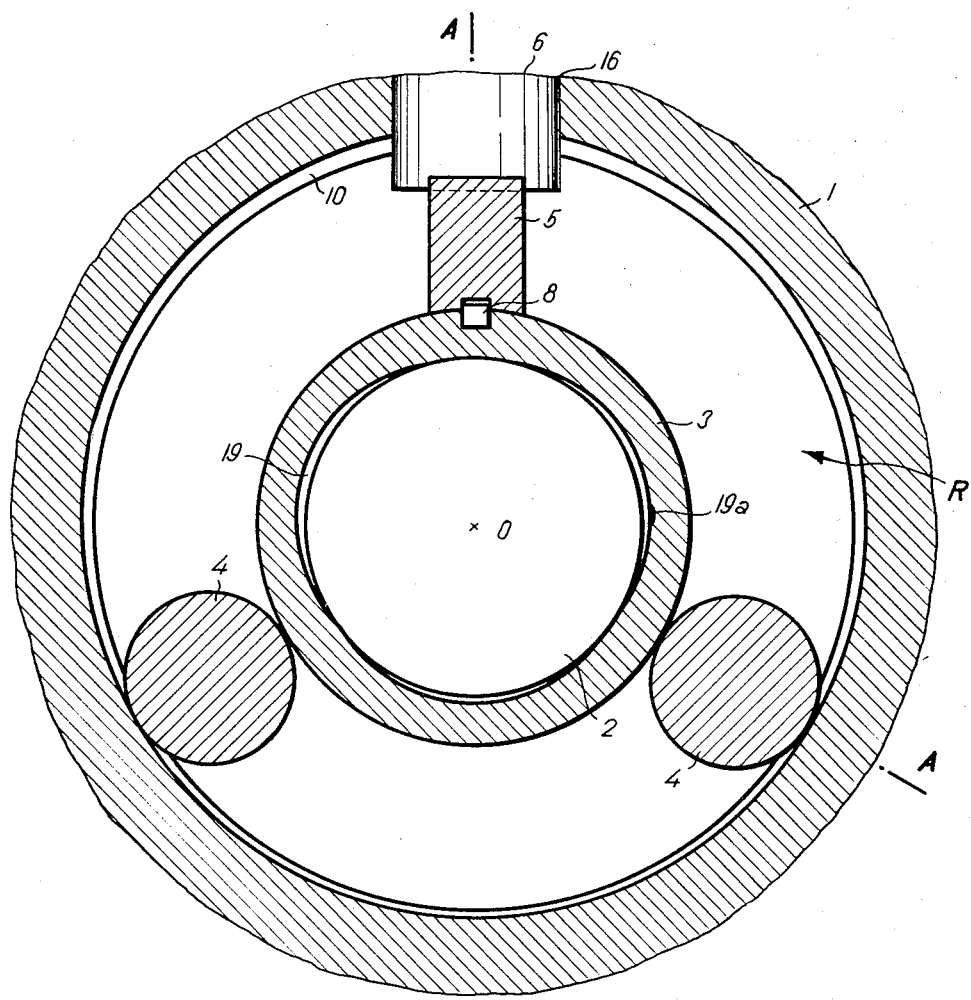
FIG. 1 is a sectional view taken along line B-B of FIG. 2 showing the bearing of the present invention.
Figure 2:
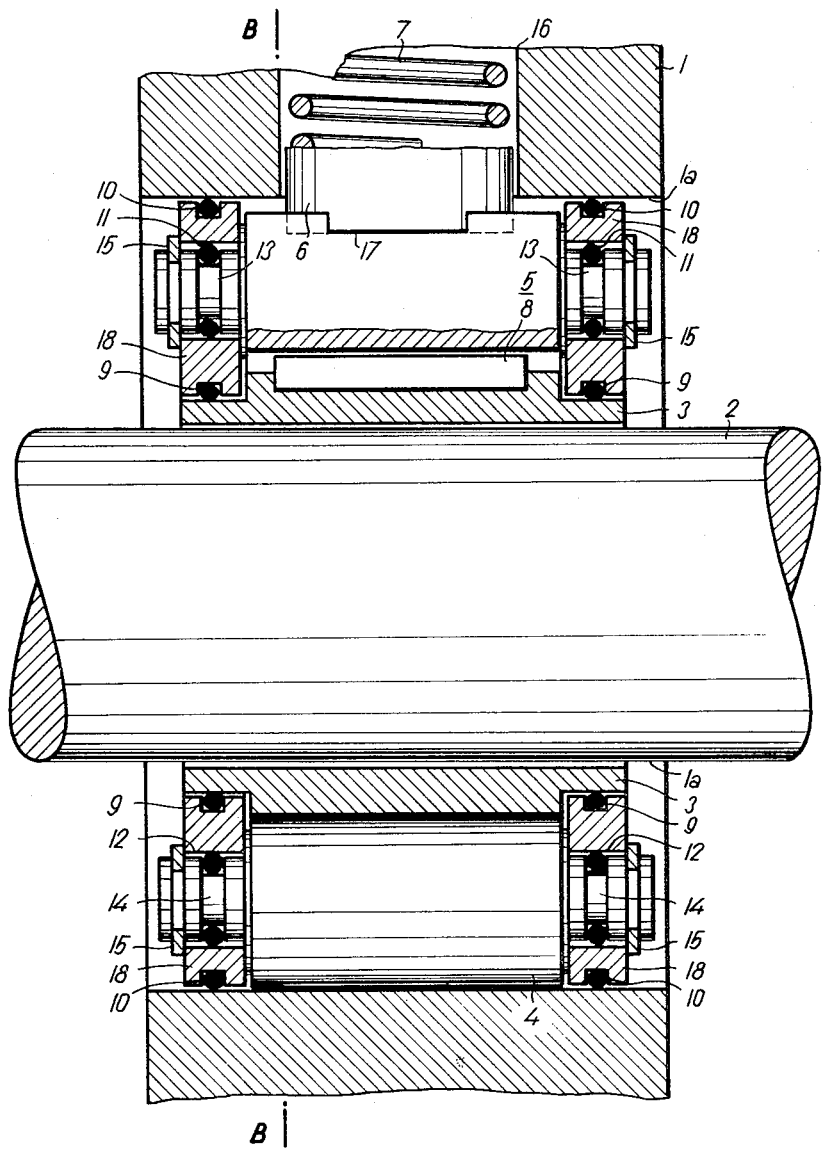
FIG. 2 is a sectional view along line A—A of FIG. 1.
Figure 3:
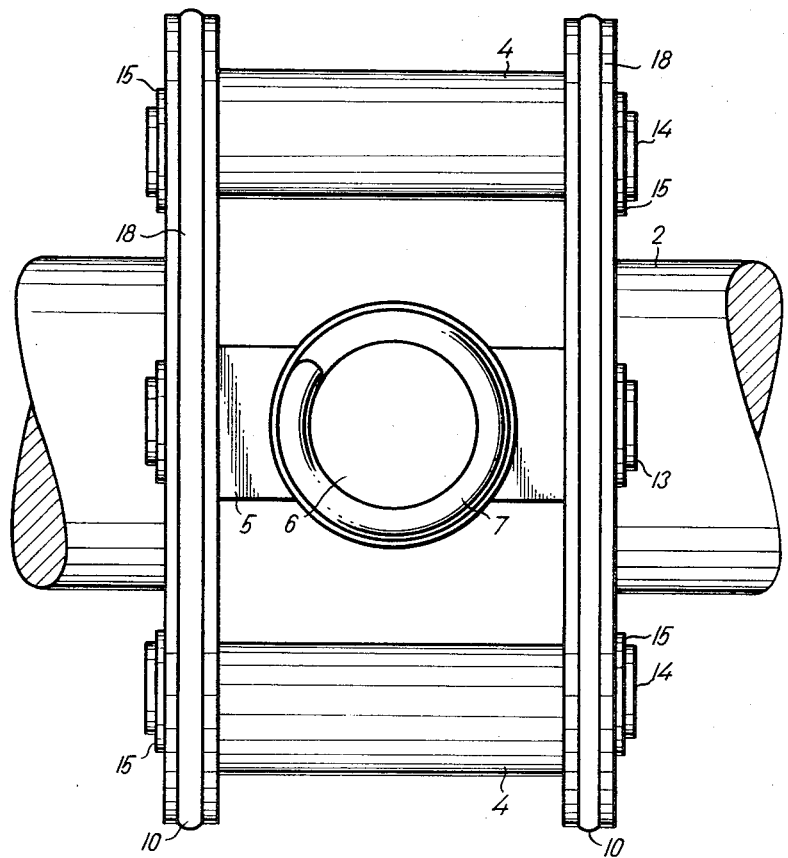
FIG. 3 is a plan view of the bearing of FIGS. 1 and 2.

Details of the radial journal bearing of the present invention is seen with reference to FIGS. 1 – 3. The spindle 2 is set within a conforming co-axial bore 1a formed in the housing body. The bore 1a is substantially larger in diameter than the spindle although, as will be seen, it forms the back of the bearing. The bore 1a of course, may be shaped along its axial length to conform to the differences in cross section of the spindle 2 and may, if desired, be lined with a liner or sleeve. The housing (and/or liner if used) is preferably formed by material of high strength. A bearing shell 3 having a diameter which is only slightly greater than the diameter of the spindle 2 is mounted about the spindle. The shell 3 may be provided with a relatively smooth inner surface which forms a bearing surface surrounding the spindle, although it does not serve as a rotating surface in this invention. The shell 3 is further supported externally, at three equidistant points from the wall of the housing bore 1a. The first point of support is along the central vertical axis of the housing bore 1a where the housing body 1, itself, is bored to provide a vertical hole 16 directed radially toward the center of the bore 1a. A compression spring 7, of preselected spring rate, is set within the hole 16 and bears at its lower end against a rest or stop member 6. The stop rest member 6 is generally in block form and has a cylindrical recess 17 formed in its lower surface, which recess 17 is adapted to receive a cylindrical prismatic body 5. The prismatic body 5 has a lower surface which is conformingly shaped to that of the outer surface of the shell 3, and is provided with a central axial slot which causes the member 5 to press against the shell along two axial lines to either side of the slot. Fitted within the slot is a bar 8. At a corresponding point, the shell 3 is provided with a corresponding slot into which the bar 8 is also simultaneously inserted so that the shell 3 and prismatic member 5 are keyed together against relative rotation although radial movement is permitted. Since the prismatic member 5 fits within the recess of rest member 6 they too are keyed together, thus preventing rotation but not radial motion of the shell with respect to the frame 1. This arrangement insures the axial and tangential stability of the prismatic member and the bearing shell 3 which permits the highly efficient and effective hydrodynamic effect resulting from the present invention.

The prismatic member 5 is provided with pins 13 extending axially outward of both its ends. The pins pass respectively through enlarged holes, formed in a pair of retaining rings 18 located on both sides of the prismatic member. The retaining rings 18 are annular ring members of metal or other high strength material having an inner diameter larger than the shell 3 so as to surround the same and an outer diameter less than that of the bore 1a. The retaining rings 18 form the axial end stops of and support the bearing assembly as a whole. The clearances between the rings 18 and the bore 1a and shell 3 are respectively packed by an inner sealing ring 9 and an outer sealing ring 10 set within the surfaces of their outer edges. The sealing rings 9 and 10 are also annular and are preferably formed of rubber-like, plastic, or other suitable resilient sealing material and are adapted to abut resiliently against the outer surface of the shell and the inner wall of bore 1a to seal the bearing. The prismatic member 5 is itself sealed between the two end retaining rings 18 by an O-ring or similar sealing packing 11 fit over the end pins 13. The end pins 13 are preferably provided with annular collars or grooves to retain the packing 11. Snap or C-clamps 15 or other fasteners of the clip-on or removable type are employed at each end of the prismatic member 5 to retain it and its seal members in place.

The two remaining points at which the shell 3 is supported is offset from the position of prismatic member 5 (i.e. the vertical axis) by 120° to either side. Located at each of these two points is a cylindrical roller 4 arranged along an axis parallel to that of the spindle and along the length of the shell. The diameter of each roller 4 is substantially that of the radial distance between the outer surface of shell 3 and the wall of bore 1a. Each roller is provided at its ends with a pin 14 passing through and journalled in a corresponding hole formed in each of the annular retaining rings 18. The pins 14 of each of the rollers 4 are also packed by an O-ring seals or similar means 12 and are also provided with annular collars or grooves to seat the same in the manner described above with regard to the prismatic member 5. Snap fasteners 15 are also used.

It will be observed that the retaining rings 18 provide a simple and effective means for forming a hydrodynamically sealed bearing in a unitary compact assembly while still permitting the retaining rings, collars and support members to move. The snap rings 15 permit assembly of the shell 3, the prismatic member 5 and rollers 4 into a portable easily insertable and removable assemblage which can be mounted over the spindle 2 and in the bore 1a without completely tearing down the machine. To effect this, it will be understood that the rest member 6 and the prismatic member 5 are only fit one with the other and are separable; by removing the stop rest 6 the entire assembly is thus axially movable in the bore 1a. Removal of the stop rest 6 can be easily made by providing the housing body 1 with a longitudinal keyway in which a corresponding key 30 (FIG. 4) may be fit. By withdrawing the key 30 the spring 7 and the stop rest 6 may be removed. As seen in FIG. 4, the key 30 may be vertically withdrawn although it may also be arranged to be axially withdrawn from the keyway.

The arrangement of the retaining rings 18, seals 9 and 10 and packing 13 and 14 enable the functioning of the device in another advantageous manner. In operation the shell 3 is adapted to be deformed under both static and dynamic loading. The deformation is permitted by the ability of the rollers 4 to move about the outer surface of the shell 3 and the wall of the bore 1a within their resilient journals and by the resilient mounting of the prismatic member 5. The use of resilient sealing rings and packings allow such deformation without distortion of the side retaining rings 18 and simultaneously maintaining the integrity of the sealed reservoir and pressure within the bearing. Symmetrical deformation of the shell 3 is insured by this construction.

It will thus be seen that the present bearing assembly comprises a shell 3 having a pair of rolling members 4 and a fixed member 5 spaced equidistant about it, and supported by side retaining rings 18, sealed with respect to the mounting means. Thus formed the assembly is placed in the bore 1a resting on the rollers 4. The stressing members comprising rest 6 and spring 7 are inserted. The interior of the bearing thus forms an enclosed or sealed reservoir R which is then filled with suitable lubricating oil of desired and predetermined viscosity. The spindle is then inserted and the bearing assembly adjusted for operation.

In the free or non-adjusted state the inner diameter is only some hundreths of a millimeter greater than that of the spindle 2. Adjustment is necessary to delineate this radial clearance and to achieve optimum hydrodynamic function of the bearing. Static pre-stressing is then applied to the shell 3 to deform it and stress it also against the spindle 2 by the action of the spring 7 on the prismatic member 5. The spring rate preselected for the effect desired biases the prismatic member with a constant force. The adjustment causes the shell 3 to deform symmetrically and to lose its circular or cylindrical shape. The shell assumes the shape of a somewhat symmetrical or equilateral triangle and its inner walls bear against the spindle along three surface lines relative to each of the points of contact between the rollers 4 and the prismatic member 5 respectively, with the shell 3. As a result wedge shape lubricating pockets 19 are formed. The shell 3 is formed outwardly directed with channels or grooves 19a of the conventional form for the passage of lubricating oil from the surrounding reservoir to the wedge pockets 19. Upon such adjustment the spindle might be defined as being pre-stressed or preloaded by a static force $P_s$ as seen in FIG. 5 (a) acting radially inward against the spindle 2 at each point of contact.

In the initial stage of machine operation the spindle 2 is caused to rotate without any external loading (i.e. no grinding). The lubricating oil molecules located in the wedges 19 are displaced and form a continuous film of oil about the spindle 2. As seen in FIG. 5 (b) the film has a uniform thickness of $\delta_o$ about the spindle. The hydrodynamic forces generated in the moving wedges 19 generates an increasing pressure of the oil between the shell 3 and the spindle 2 forcing the shell 3 outwardly into a more circular cross sectional shape.

Figure 5:
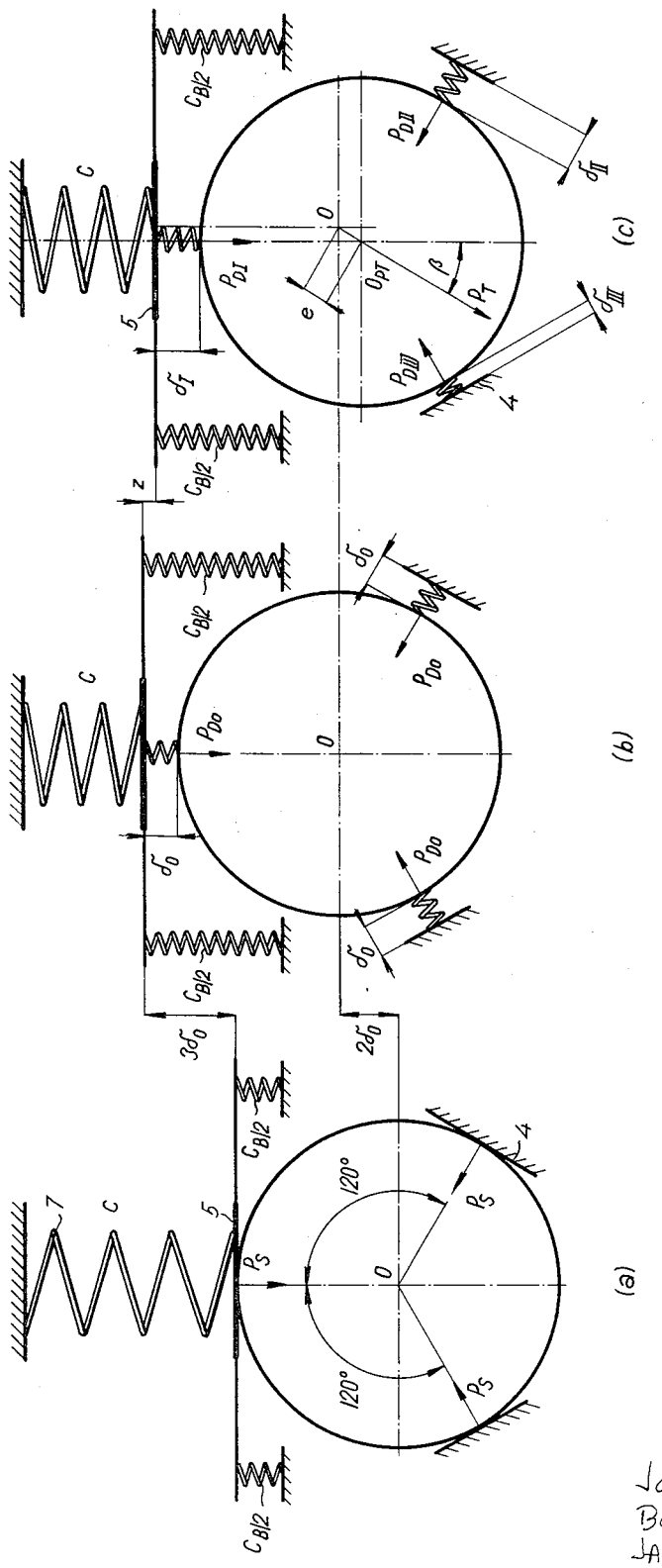
FIG. 5 is a schematic view of the function of the bearing during (a) initial start-up, (b) non-work load operation, (c) loaded operation.

The geometrical conditions (i.e. the deformation of a cylinder into a triangular cross section) generate an increase in pressure in the oil film and a change in behavior of the shell 3 (FIG. 5). This occurs as a consequence of the fact that the upper support, i.e.: prismatic member 5 is pushed against the pre-stressing spring 7. The amount of this push, in the vertical direction is three times the thickness of the oil film (i.e.: $3\delta_o$). Consequently, the direct vertical movement of the spindle 2 is twice the thickness of the film of oil (i.e.: $2\delta_o$) as seen in FIG. 5 (b). Thus the spindle 2 "flows on" by $2\delta_o$ and is completely surrounded by pressurized oil. Meanwhile the static loading or pre-stressing force $P_s$ continues to act. As a final result the magnitude of the hydrodynamic forces in the initial start up stage shown in FIG. 5 (b) and without external loading can be defined by the formula 1. $P_{Do} = (C_B + C)_3 \delta_o + P_s$ where $C$ is the constant of spring and $C_B$ is the resilient back pressure on the prismatic member 5.

To enable a better understanding of the conditions within the bearing the actual load of the oil may be thought of as being divided into an inner load $P_B$ and an outer load $P_T$. The inner load, prior to the actual work loaded operation of the spindle is caused by the force required to deform the shell 3 and pre-stress spring 7 when the oil film $\delta_o$ is created and further by the static pre-stressing $P_s$. Thus, when the spindle 2 is placed into initial rotation the inner force $P_B$ directly equals the hydrodynamic force $P_{Do}$ and the spindle assumes a balanced position concentric about the center O.

The outer loading is a function of the masses of the spindle, grinding wheel and driving members and in the course of operation is constantly being changed as a result of the forces acting upon its members by grinding or cutting. Thus, the bearing reacts under operation to the impression of the outer load $P_T$ which of course, is a directional resultant of all the forces. The axis of the spindle is displaced by a value $e$ into a new balanced position $O_{PT}$ offset from the center O of the shell 3, as seen in FIG. 5 (c). The thickness of the initial oil film is also changed and assumes a non-uniform characteristic about the spindle in conformity to the resultant external load $P_T$. The upper support prismatic member 5 is also displaced by a value $z$. The pressure forces generated at each of the supporting points 4 and 5 are also changed and assume non-uniform values $P_{DI}$, $P_{DII}$, and $P_{DIII}$ respectively. These forces must be in balance with the inner load $P_B$ as well as the reaction to the outer load $P_T$. This state of balance is expressed by the following formulas:

2. $P_T + P_{DI} \cdot \cos \beta = P_{DII} \cdot \cos(60° + \beta) + P_{DIII} \cos(60° - \beta)$ 3. $P_{DI} = P_B = P_{D_a} - (C_B + C)z$ where $\beta$ equals the angle between resultant direction of force $P_T$ and the diameter passing through the movable support $P_I$.

The above equations mathematically describe the conduct of the forces within the bearing. They are basic to the mathematical theory required to determine the required rigidity and corresponding parameters of the shell 3 in order to obtain the optimum function, bearing capacity and precision.

During operation, as seen in FIG. 5 (c) the bearing reaches a state of balanced dynamic forces. When rotation of the spindle occurs the oil pressure of course, increases and deforming the shell into a more nearly perfect cylinder. As a consequence of the relationship noted above all the parts automatically adjust into dynamic balance providing a film of oil completely around the spindle, eliminating throughout the entire operation any contact between the spindle and the shell. The center $O_{PT}$ with an optimum clearance is thus determined for the best performance. The optimum rigidity of the bearing and its optimum load capacity are obtained in this manner with-out any danger of bearing damage or seizure. As the speed of the spindle increases (i.e. is R.P.M.'s increase) the hydrodynamic forces in the lubricating oil increases correspondingly. The pressure of the lubricating oil increases and so displaces the spindle away from the walls of the shell with greater pressure. This pressure remains responsive to the actual exterior loading and the spindle is constantly and automatically adjusted about a center of balance even under changing speeds. The fact that the spindle is constantly floating and moving on a surrounding film of oil has the advantageous result of preventing seizure. Thus, the spindle can operate at a great range of speeds, optimumly, efficiently and without damage. The range of speed (i.e. R.P.M.) can be varied in a range where the highest speed can be 25 or more times as great as the minimum efficient speed (that is the speeds can be easily adjusted for any given bearing-spindle arrangement in a range of 1:25 R.P.M.

Since the actual mechanical load on the shell 3 is minimal, the shell 3 may be chosen of a suitable bearing material such as steel, brass etc. The thin film of oil which always separates the spindle and the shell reduces frictional forces to almost nil and therefore, permits the shell to be made of inexpensive materials if desired. The shell wall thickness is not critical and can be chosen only to meet the mechanical stress and loading required. It is necessary that it be thick enough to withstand the oil pressure but thin enough to be deformed by the roller supports and the oil under operating conditions described above.

It will thus be seen that a hydrodynamic bearing, or radial film bearing journal of improved performance and reliability has been achieved. The bearing does not require adjustment when external load conditions are changed since such adjustment is automatic. The bearing may thus also be made inexpensively and simply. Unlike prior art bearings which were required to be manufactured with the utmost precision the present bearing may be made with gross tolerances and relatively rough dimensions. The fact that there are no rotating contacting surfaces and the fact the the bearing itself is a pressurized film of oil permits the surfaces and dimensions of the metallic parts to be only roughly gauged. Automatic adjustment is effected even under such conditions.

The present disclosure illustrates the invention. It will be appreciated that various modifications and changes are possible and such will be obvious to those skilled in this art. Limitation of the present invention is therefore not to be made except relative to the appended claims.

What is claimed

1. A hydrodynamic bearing comprising a rotating spindle or the like, a cylindrical shell surrounding said spindle, a plurality of support means extending parallel to the axis of said shell and spaced about the circumference thereof, at least one of said support means being mounted for radial movement relative to said shell, biasing means for urging said movable support means against said shell to temporarily deform said shell, housing means surrounding said shell and support means for forming a sealed reservoir, and a bearing fluid located in said reservoir, channel means within said shell for passing said bearing fluid from said reservoir to the space about said spindle, the rotation of said spindle causing said bearing fluid to form a pressurized film between said spindle and shell tending to expand said shell against said movable support and into its normally cylindrical shape.

2. The bearing according to claim 1 wherein said support means are symmetrically arranged about said shell.

3. The bearing according to claim 1 having their support means located equidistant about the circumference of the shell, two of said support means being fixed against radial movement between said shell and the walls of said bore, the third support being movably biased by spring means urging said third support against said shell to temporarily deform the same into a triangular shape.

4. The bearing according to claim 3 including means for preventing rotation of said shell relative to the housing.

5. The bearing according to claim 4 wherein said housing is formed with a radial hole, aligned with said movable support, and includes a spring located in said hole and a rest member interposed between said spring and said movable support, said rest member and said movable support and said shell having corresponding slots and a key inserted therein to prevent rotation of said shell but permit radial movement.

6. The apparatus according to claim 3 wherein said fixed supports comprise cylindrical rollers.

7. The bearing according to claim 3 wherein said housing means including a pair of annular retaining rings surrounding said shell and journalling said support means and resilient seals interposed between said rings and the surface of said shell and the wall of the bore in said housing to seal the same and permit radial movement of said rings relative to said bore.

8. The bearing according to claim 7 wherein said support means are provided with axially extending pins journalled with opening formed within said retaining rings, said opening providing radial clearance about said pins, and includes resilient packing means sealing said clearance and permitting radial movement of said pins within said opening.

9. The bearing according to claim 7 including channel means for delivering fluid from said reservoir to the interface between said shell and spindle.

10. A fluid bearing system journalling a rotatable shaft, comprising a deformable journal sleeve surrounding said shaft, support means for supporting said sleeve about its outer circumference along three axial lines at least one of said support means being freely movable radially of said sleeve, means resiliently prestressing said one support means to deform said shell to create at least one wedge with respect to said shaft and supplying fluid to said wedge whereby on rotation of said shaft said wedge displaces said fluid and causes the same to create a pressurized film layer continuously about the shaft, to cause said sleeve to overcome said prestressing.

11. The system according to claim 10 wherein when said one support is prestressed under no external load condition on said shaft the value of the hydrodynamic force on said shell at any support point is calculated according to the formula:

$$1. P_{DO} = (C_B + C) 3\delta_0 + P_S$$

where $C$ is the rate constant of the prestressing means, $C_B$ is the rate of back pressure against said prestressing means, $\delta_0$ is the thickness of the fluid film and $P_S$ is the pressure extended by said one support radially on said shell.

12. The system according to claim 11 wherein when a load is applied to said shaft the hydrodynamic force on the shell at any supporting point can be calculated according to the following formulas:

$$2. P_T + P_{DI} \cos = P_{DII} \cos(60° + \beta) + P_{DIII} \cos(60° - \beta)$$

and $$3. P_{DI} = P_B = P_{v_a} - (C_B + C)z$$

where:

$P_I, P_{II}$, and $P_{III}$ are the radial forces at the points of support respectively $P_I$ being located at said prestressed support, $\delta$ is the angle between the resultant line of force created by the external load and the diameter through the prestressed support $P_T$ is the external load force on the spindle $P_B$ is the internal force on the spindle, and $z$ is the deviation between the original position of said prestressed member and its position during rotation.

* * * * *